(12) United States Patent
Brouwer

(10) Patent No.: US 6,253,697 B1
(45) Date of Patent: Jul. 3, 2001

(54) SHIP PROVIDED WITH A DISTORTION SENSOR AND DISTORTION SENSOR ARRANGEMENT FOR MEASURING THE DISTORTION OF A SHIP

(75) Inventor: Jan Klaas Brouwer, Diepenheim (NL)

(73) Assignee: Hollandse Signaalapparaten B.V., Hengelo (NL)

( * ) Notice: Subject to any disclaimer, the term of this patent is extended or adjusted under 35 U.S.C. 154(b) by 0 days.

(21) Appl. No.: 09/485,715

(22) PCT Filed: Aug. 12, 1998

(86) PCT No.: PCT/EP98/05279

§ 371 Date: Mar. 1, 2000

§ 102(e) Date: Mar. 1, 2000

(87) PCT Pub. No.: WO99/11517

PCT Pub. Date: Mar. 11, 1999

(30) Foreign Application Priority Data

Sep. 1, 1997 (NL) .................................... 1006896

(51) Int. Cl.[7] ...................................... B63B 3/00
(52) U.S. Cl. ..................... 114/65 R; 114/343; 114/382; 356/141.3
(58) Field of Search .................. 114/382, 65 R, 114/343, 74 R, 72; 356/141.3; 250/206.2

(56) References Cited

U.S. PATENT DOCUMENTS

| 3,733,134 | * | 5/1973 | Kadoya | 356/141.3 |
| 3,790,276 | * | 2/1974 | Cook et al. | 356/141.3 |
| 4,562,769 | | 1/1986 | Heynau et al. | |
| 4,639,878 | * | 1/1987 | Day et al. | 364/513 |
| 5,038,618 | * | 8/1991 | Malvern | 73/800 |

FOREIGN PATENT DOCUMENTS

| 32 09 582 | | 9/1983 | (DE) . |
| 4108729 | * | 3/1991 | (DE) . |
| 2 132 740 | | 7/1984 | (GB) . |
| WO 82/04319 | | 12/1982 | (WO) . |

* cited by examiner

Primary Examiner—Ed Swinehart
(74) Attorney, Agent, or Firm—Oblon, Spivak, McClelland, Maier & Neustadt, P.C.

(57) ABSTRACT

An improved ship which incorporates a distortion sensor arrangement. Measurement data supplied by the distortion sensor arrangement is preferably used to correct measurement data supplied by and/or control signals for an on-board directional apparatus. The distortion sensor arrangement preferably includes a hull-mounted laser beam/light sensor combination, and such that the light sensor continuously measures a deflection of the laser beam in response to a distortion of the ship.

10 Claims, 3 Drawing Sheets

A

B

C

SHIP PROVIDED WITH A DISTORTION SENSOR AND DISTORTION SENSOR ARRANGEMENT FOR MEASURING THE DISTORTION OF A SHIP

BACKGROUND OF THE INVENTION

1. Field of the Invention

The invention relates to a ship and, more particularly, to a naval ship.

2. Discussion of the Background

In general, ships have a limited rigidity. Modern naval ships in particular are of a thin-walled construction with a view to optimal weight reduction. A drawback of the limited rigidity is that the ship is liable to distortion caused by, for instance, sea state, differences in temperature or payload. This drawback particularly manifests itself if the ship is provided with a measuring instrument for performing angular position measurements of objects in relation to the ship. For an accurate angular position measurement, the angular position of the measuring instrument itself shall be accurately known. This angular position is usually determined in an alignment procedure. In the process of time, however, this angular position is apt to change as a result of the ship's distortions.

SUMMARY OF THE INVENTION

The ship according to the invention has for its object to obviate this drawback and is thereto provided with a distortion sensor for at least substantially continuously measuring distortions of the ship.

An additional advantage is that the rigidity of the ship needs no longer be such that the measuring instrument is susceptible, in relation to the measuring error, to an angular displacement that is still acceptable. This means that the weight and, consequently, the cost of the ship can be reduced.

The distortion measurements can now, at least substantially continuously and during service conditions, be presented on a display or be used for any other purpose.

In an advantageous embodiment the distortion measurements are used to ascertain the ship's torsional and bending distortions as these largely affect the position of onboard equipment units. Particularly torsional distortions about the longitudinal axis and bending distortions about the transverse axis are relevant in this respect.

An advantageous embodiment in which the ship is provided with at least one target sensor and a processing unit for processing the measurement data supplied by the target sensor is characterized in that the processing unit or target sensor is provided with correction means for correcting the measurement data supplied by the target sensor with the aid of measurement data supplied by the distortion sensor.

In this embodiment, the target sensor accuracy is significantly enhanced.

A further advantageous embodiment in which the ship is further provided with a directional apparatus and control means for generating control signals for the directional apparatus is characterized in that the control means or the directional apparatus is provided with correction means for correcting the control signals with the aid of measurement data supplied by the distortion sensor.

The directional apparatus may comprise an optical tracker, a tracking radar or a gun system. In this embodiment, the aiming accuracy of the directional apparatus is significantly enhanced.

The invention additionally relates to a distortion sensor arrangement for measuring the distortion of a ship, comprising:

a light source for generating a narrow light beam to be connected to a first part of the ship;

a light sensor to be connected to a second part of the ship, designed to deliver a deflection signal of the light beam in response to incident light of the light beam on the light sensor.

The advantage of such an arrangement is its capability to continuously produce an electric signal that is representative of the ship's distortion, which signal can be used for any purpose required. The sensor arrangement's sensitivity can be adjusted as considered fit by varying the distance between the light source and the light sensor. Besides, the measurement is to a large extent temperature-insensitive.

In an advantageous embodiment the light source comprises a laser source and the light sensor comprises a CCD array. By means of a laser source, a narrow light beam can simply be generated. The CCD array is designed to register a distortion in two dimensions.

The invention furthermore relates to a system for measuring ship distortions. The system includes a plurality of distortion sensor arrangements including a light source and a light sensor.

The light source generates a narrow light beam and is connected to a first part of the ship. The light sensor is connected to a second part of the ship, and delivers a deflection signal in response to light incident on it.

The system also has a calculation device for calculating the ship's torsional distortion angles and bending distortion angles.

Thus, a system is obtained that is capable of measuring the ship's torsional distortion angles about the pitch axis, and the ship's bending distortion angles about the transverse and yaw axes.

A ship incorporating such an arrangement has the advantage that the distortion can be accurately measured and that the resulting measurements can be used for any purpose required.

An advantageous embodiment of such a ship is characterized in that the light sensor pertaining to one or to all distortion sensor arrangements is attached to a first frame of the ship with the light source, directed at the light sensor, attached to a second frame of the ship.

In this way, the severest distortion will always be registered, since it occurs between the comparatively rigid frames. Thus, a high degree of accuracy is achieved.

BRIEF DESCRIPTION OF THE FIGURES

The ship and the sensor arrangement according to the invention will now be explained with reference to the accompanying drawings, of which.

DESCRIPTION OF THE PREFERRED EMBODIMENTS

Figure 1:
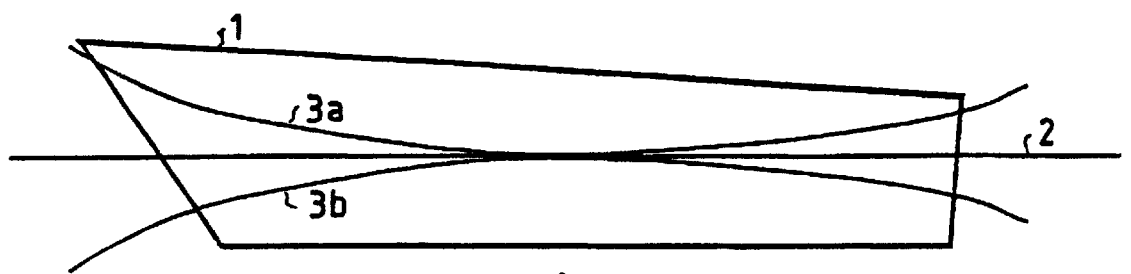
FIG. 1 is a schematic representation of relevant ship distortions.
Figure 1:
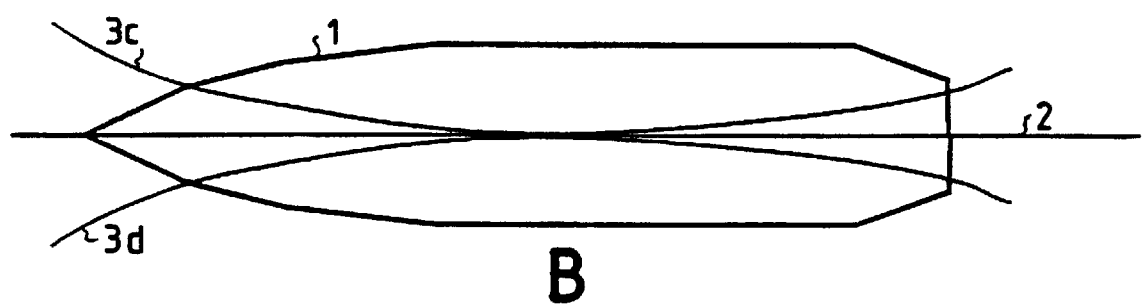
Figure 1:
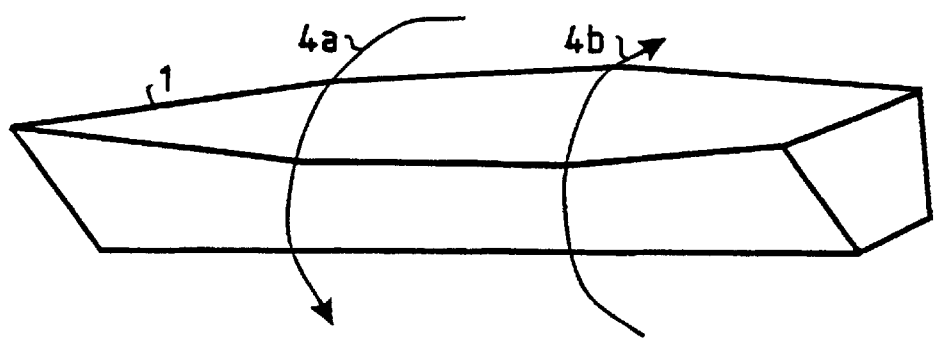

FIG. 1 schematically represents which distortions of a ship 1 are relevant within the scope of the invention. To this end, the ship is shown in side view A, top view B and perspective C. Side view A and top view C show a longitudinal axis 2 of the ship 1. As known, the ship also comprises a pitch axis and yaw axis, not shown. The influence of water acting on the ship's hull distorts the ship's longitudinal axis 2, as indicated in an exaggerated way by curved lines 3a, 3b, 3c and 3d, because of the hull bending around the pitch axis and the yaw axis. Likewise, the ship twists around longitudinal axis 2 as indicated by means of arrows 4a and 4b.

Figure 2A:
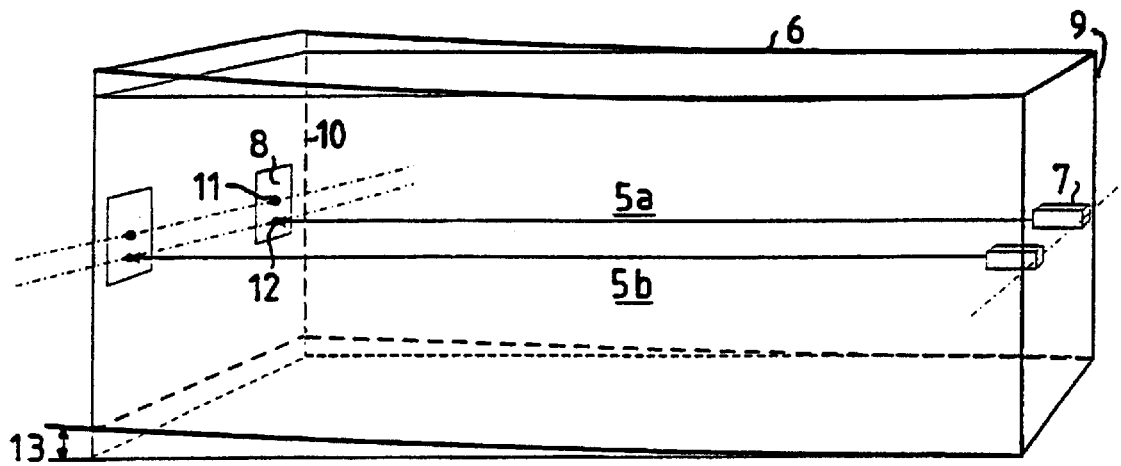
FIG. 2 schematically represents a sensor arrangement according to the invention attached to the ship's frames.
Figure 2B:
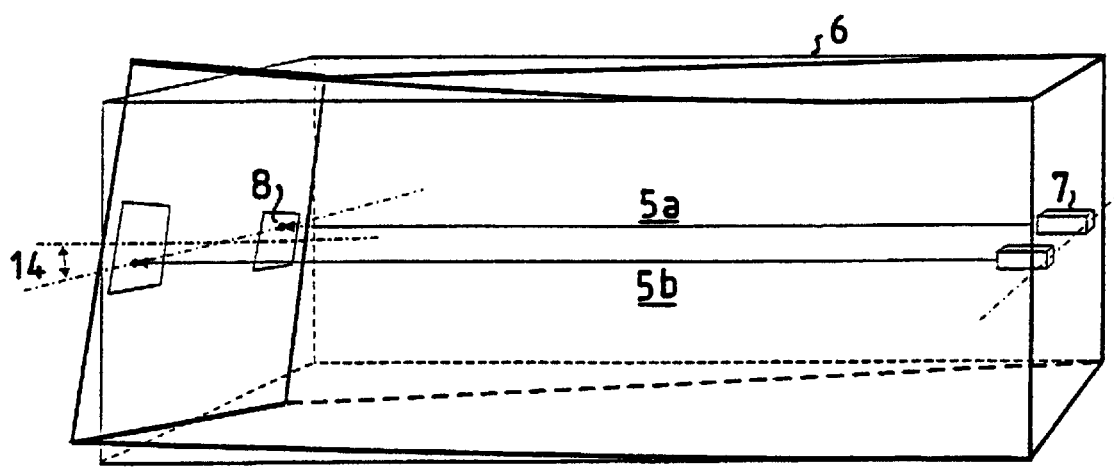

FIGS. 2A and 2B show how two sensor arrangements 5a and 5b according to the invention can be attached to the ship's frames for the purpose of measuring ship distortions. A section of the ship between two frames is schematically represented as a wire model of a box-shaped body 6, in a first, normal condition and in a second condition with the ship twisted around a pitch axis. The two sensor arrangements are mounted symmetrically in relation to the ship's symmetry plane. A sensor arrangement comprises a laser 7 and a CCD array 9, possibly incorporating a system of lenses (not shown) for focusing the laser beam onto the CCD-array. The laser is connected to a first frame 9, the CCD array is connected to a second frame 10. In normal condition, the laser beam is focused on a central point on the CCD array, creating a laser spot 11. Bending distortion causes the laser spot on the CCD array to shift to point 12 dependent on bending angle 13. The bending distortion around the yaw axis can be determined analogously.

FIG. 2B represents the same ship's section as shown in FIG. 2A, in this case subjected to a torsion 14 around the longitudinal axis. This causes the laser spots produced by the two sensor arrangements to shift antisymmetrically in relation to one another. This makes it possible to independently determine, on the basis of the locations of the laser spots on the CCD array, the degree of torsional distortion around the longitudinal axis and the degree of bending distortion around the pitch axis, by performing calculations, by addition or subtraction, on the basis of measured values produced by the CCD arrays.

Figure 3:
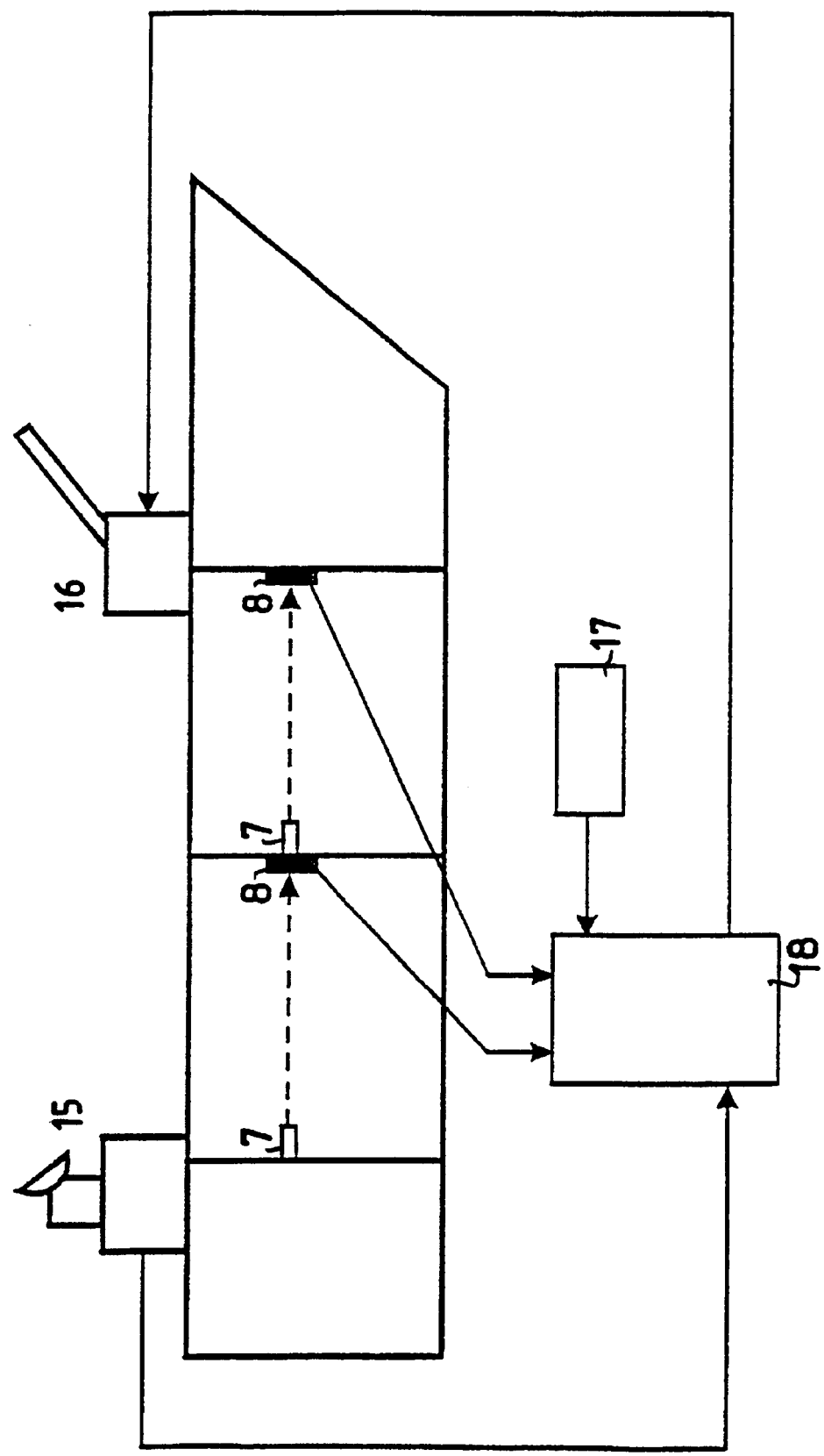
FIG. 3 represents a ship incorporating a plurality of sensor arrangements, a plurality of directional apparatus and a control computer for the directional apparatus.

FIG. 3 is a schematic representation of a plurality of frames to which a plurality of sensor arrangements are attached to enable an accurate determination of the ship's distortion. As the ship is subject to various levels of distortion, it is advantageous to arrange for a plurality of sensor arrangements.

The ship is further provided with two directional apparatus, the first of which incorporates a tracking radar 15 and the second a gun system 16. The ship also comprises a position reference unit 17, implemented as a centrally situated gyro system for determining the ship's roll, pitch and heading with respect to a north-horizontal coordinate system. Large naval ships are usually fitted with two gyro systems, one in the fore part and one in the stern part. A fire control computer 18 determines control signals for the gun system on the basis of data of the tracking radar and the gyro system. The tracking radar is engaged in tracking a target not shown in the figure, e.g. a missile. The target range and direction relative to a sensor coordinate system connected to the tracking radar are measured by means of the tracking radar. The resulting values are subsequently converted to coordinates with respect to a centrally situated own-ship coordinate system. In this respect, the distance between the sensor coordinate system and the origin of the own-ship coordinate system as well as the alignment angles of the sensor coordinate system, determined in a prior alignment procedure, in relation to the own-ship coordinate system, are factors that are taken into account.

According to the invention, account is however also taken of static and dynamic angular displacements of the sensor coordinate system with respect to the own-ship coordinate system as a result of the ship's liability to torsional and bending distortions. To that end the measurements made by the CCD arrays 8 are supplied to the fire control computer 18 which converts the displacements of the laser spots on the CCD array to these angular displacements. The fire control computer subsequently corrects these target measurements which can of course also be corrected in the tracking radar. In case of corrections in the tracking radar, the CCD-array measurements are supplied to a calculation unit incorporated in the radar system. Large naval ships then no longer need to be provided with two gyro systems, one in the fore part and one in the stern part. A single gyro system, centrally situated, will then, in combination with the angular distortion sensors, be sufficient.

The control signals for the gun system 16 can be corrected analogously. The gun system is thereto connected to a gun coordinate system whose angular displacements in relation to the own-ship coordinate system are determined on the basis of measurements performed by the sensor arrangement.

In order to measure distortion on any given place in the ship on the basis of a limited number of angular sensor arrangements, an interpolation may be performed among the various sensor arrangements concerning the measured angular distortions.

What is claimed is:

1. A system for measuring ship distortions that can be expressed in terms of torsional distortion angles and bending distortion angles, the system comprising:
   a) a first distortion sensor that continuously measures first torsional distortion and first bending distortion, the first distortion sensor including:
      1) a first light source, connected to a first part of the ship, that generates a first narrow light beam; and
      2) a first light sensor, connected to a second part of the ship, that provides a first deflection signal in response to light of the first light beam that is incident on the first light sensor;
   b) a second distortion sensor that continuously measures second torsional distortion and second bending distortion, the second distortion sensor including:
      1) a second light source, connected to a third part of the ship, that generates a second narrow light beam; and
      2) a second light sensor, connected to a fourth part of the ship, that provides a second deflection signal in response to light of the second light beam that is incident on the second light sensor; and
   c) a calculation device configured to calculate the ship's torsional distortion angles and bending distortion angles based on the first and second deflections signals.

2. The system of claim 1, wherein:
   the light source includes a laser source; and
   the light sensor includes a charge coupled device (CCD) array.

3. A ship provided with the system of claim 2.

4. The ship of claim 3, wherein:
   a particular light sensor is attached to a first frame of the ship; and
   a particular light source that is directed at the particular light sensor is attached to a second frame of the ship.

5. The ship of claim 4, wherein the distortion sensor provides distortion measurement data; and the ship further comprises:
   at least one target sensor that supplies target sensor measurement data;

a correction device configured to correct the target sensor measurement data in accordance with the distortion measurement data supplied by the distortion sensor; and a processing unit that processes measurement data as corrected by the distortion measurement data.

6. The ship of claim 5, further comprising:

a directional apparatus;

a control device that provides control signals for the directional apparatus; and a correction device configured to correct the control signals.

7. A ship provided with the system of claim 1.

8. The ship of claim 7, wherein:

a particular light sensor is attached to a first frame of the ship; and a particular light source that is directed at the particular light sensor is attached to a second frame of the ship.

9. The ship of claim 8, wherein the distortion sensor provides distortion measurement data; and the ship further comprises:

at least one target sensor that supplies target sensor measurement data;

a correction device configured to correct the target sensor measurement data in accordance with the distortion measurement data supplied by the distortion sensor; and a processing unit that processes measurement data as corrected by the distortion measurement data.

10. The ship of claim 9, further comprising:

a directional apparatus;

a control device that provides control signals for the directional apparatus; and a correction device configured to correct the control signals.

* * * * *